United States Patent [19]

Nishimura et al.

[11] 4,083,177

[45] Apr. 11, 1978

[54] LIQUID CRYSTAL DISPLAY WRIST WATCH

[75] Inventors: Katsuo Nishimura, Tokorozawa; Tetsuya Yasuda; Tomomi Murakami, both of Tokyo; Masateru Yoshida, Tanashi; Minoru Natori, Hidaka; Yoshio Iinuma, Higashimurayama, all of Japan

[73] Assignee: Citizen Watch Co. Ltd., Tokyo, Japan

[21] Appl. No.: 508,846

[22] Filed: Sep. 24, 1974

[30] Foreign Application Priority Data

Sep. 25, 1973  Japan ............................ 48-111687

[51] Int. Cl.² .................. G04C 3/00; G04B 29/00; G04B 33/00; B21J 7/12
[52] U.S. Cl. .................. 58/23 R; 58/52 R; 58/55; 58/59; 73/431; 361/411
[58] Field of Search ............. 58/23 R, 4 A, 58, 50 R, 58/52, 53-55, 59; 317/127 B, 101 CC; 340/324 A, 336; 40/52 R, 130 R; 339/17 L; 358/160 LC; 428/1

[56] References Cited

U.S. PATENT DOCUMENTS

| | | | |
|---|---|---|---|
| 3,689,131 | 9/1972 | Klein | 340/324 R X |
| 3,718,842 | 2/1973 | Abbott et al. | 317/101 CC |
| 3,757,510 | 7/1973 | Dill | 58/50 R |
| 3,838,568 | 10/1974 | Zucher et al. | 58/23 R X |
| 3,841,083 | 10/1974 | Bergey | 58/50 R |
| 3,861,135 | 1/1975 | Seeger, Jr. et al. | 58/50 R |
| 3,863,436 | 2/1975 | Schwarzchild et al. | 58/50 R |
| 3,910,029 | 10/1975 | Yamazaki | 58/50 R |

*Primary Examiner*—Edith S. Jackmon
*Attorney, Agent, or Firm*—Sherman & Shalloway

[57] ABSTRACT

A liquid crystal display wrist watch is disclosed which comprises a supporting frame secured to a wrist watch substrate. The frame has two perpendicularly crossing supporting surfaces which cooperate with two corresponding reference sides of a liquid crystal cell to determine the position of exterior electrodes of the liquid crystal cell and segment electrodes of an electronic circuit. A holding frame plate is used for detachably urging the liquid crystal against the suppporting frame. A boundary plate and color filter are each sandwiched between a movement and a protective glass cover. A portion is provided for determining the position of the holding frame plate, with respect to either to the movement or an outer case.

18 Claims, 18 Drawing Figures

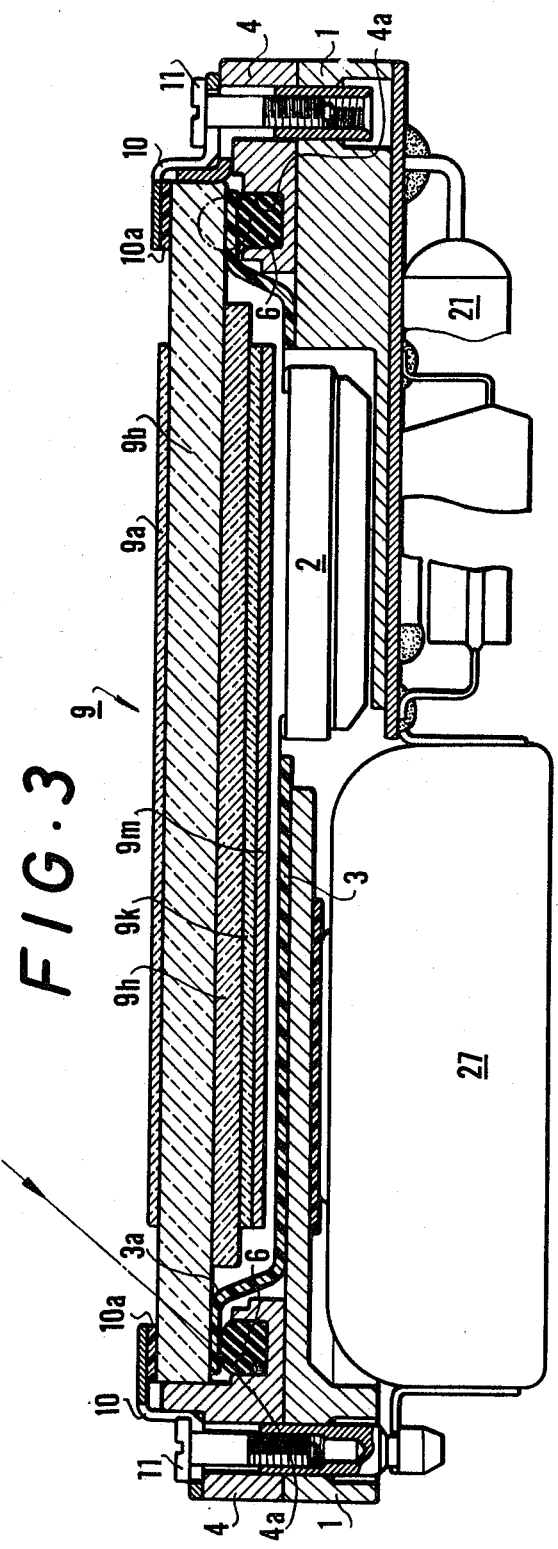

LIQUID CRYSTAL DISPLAY WRIST WATCH

BACKGROUND OF THE INVENTION

1. Field of the Invention

This invention relates to a liquid crystal display wrist watch having an improved construction adjacent to a display part and particularly having an improved support and the like for a liquid crystal display cell.

2. Description of the Prior Art

Generally a liquid crystal display device has mounted to thereon, a display panel, which includes a liquid crystal cell composed of a pair of glass plates, a liquid crystal film sandwiched between these glass plates, and a transparent electrode and reflecting electrode vapor deposited on each of the glass plates.

Depending on the type of liquid crystal, the liquid crystal cell may further include a polarizing plate and a reflecting plate.

The liquid crystal cell is mounted on the display device by holding the glass plate constituting the liquid crystal cell. It is difficult to precisely work the glass plate so that difficulties arise in precisely mounting the liquid crystal cell on a timepiece or the like, wherein it is required to mount the liquid crystal cell thereon by taking the mounting precision into consideration.

In addition, a liquid crystal cell applied to electronic timepieces must be supported at a position which is correct with respect to a timepiece substrate on which are mounted a step-up circuit and other circuits. Moreover, connection terminals corresponding to a number of segments constituting a display surface must reliably be connected to connection terminals of an electronic circuit.

In general, the display by the liquid crystal cell is effected by a difference in contrast between the substrate and the display patterns produced by external light projected thereon. In a liquid crystal display element which makes use of a polarizing plate such as, for example, a twist liquid crystal and the like in which rotary effect of a polarizing surface of a liquid crystal layer is controlled by an electric field, the substrate is preferably made of a material having a high reflective as much index for the purpose of reflecting light from the substrate as possible.

Heretofore, with a reflection type display element which makes use of a polarizing plate of the twist liquid crystal, type it has been the common practice to use a rear reflecting plate made of an aluminum foil. In this case, the total surface of both the polarizing plate and the reflecting plate are adhered to glass plates with the twist liquid crystal sandwiched therebetween with the aid of a transparent adhesive agent. Alternatively, in the liquid crystal timepieces, the polarizing plate, reflecting plate and glass plates are incorporated into and secured to the timepiece by means of screws and the like.

If the reflecting plate is adhered over its total surface to the glass plates, bubbles are occluded in the adhesive layer during the manufacturing step and, hence, results in a material decrease in yield and the disadvantage that it is difficult to determine the correct relative position between the glass plate and the reflecting plate. If use is made of a reflecting plate with characters, patterns and the like printed thereon, difficult problems arise that the adhesive agent causes a blur of the printing ink and the like.

In addition, the liquid crystal cell for supporting the display part of the liquid crystal display wrist watch inclusive of an electrical connection between the liquid crystal cell and output terminals of a liquid crystal driving circuit must be mounted carefully on the wrist watch substrate. That is, the electrical connection between the terminals of the liquid crystal cell and the output terminals of the liquid crystal driving electronic circuit is reliably held in a stable manner and the liquid crystal cell with the liquid crystal sandwiched between two flat plates made of inorganic material such as glass the like is so held on the wrist watch substrate that no cracks occur in the glass.

Heretofore, it has been the common practice to adhere the liquid crystal cell to the circuit substrate by means of an conductive paste or the like or to support the liquid crystal cell by a metal plate or to adhere the liquid crystal cell to a member such as a boundary plate or the like.

It is a matter of course that a wrist watch movement which is thin, and which can display various kinds of functions and the like will be developed in future. For this purpose, the liquid crystal cell must be thin or the display area must be enlarged. In such a case, it is inevitable with the prior art technique that difficult problems arise in that the above described electrical connection is not reliable or the liquid crystal cell becomes broken by slight shocks.

In addition, indium oxide or tin oxide is suitable for the electrode of the liquid crystal cell provided for the liquid crystal display device. In view of its chemical properties, indium oxide is preferable and hence the electrode of the liquid crystal cell is often made of indium oxide.

Exterior electrodes of the liquid crystal cell may also be made of indium oxide. But, due to its chemical properties indium oxide per se is not preferable as a contact metal. Preferably, output terminals of the liquid crystal driving circuit may be made of a metal selected from the group consisting of gold, platinum, silver and paradium. These metals are suitable from their chemical property as the contact metal.

The standard oxidation electric potential $E°$ of indium oxide is 0.342 V, that of gold is $-1.50$ V, that of platinum is about $-1.2$ V, that of silver is $-0.800$ V and that of paradium is $-0.987$ V. As a result, no high oxidation electric potential difference occurs at the contact point between the exterior electrodes and the output terminals and hence the contact point is not corroded.

A liquid crystal display cell used, particularly, for a wrist watch and the like on which are arranged a plurality of very small digital characters, symbols and the like, must usually be provided with 10 small connection terminals.

As described above, the liquid crystal cell of the liquid crystal display device is composed of two glass plates, two electrodes deposited on the opposed surfaces of these glass plates and a liquid crystal sandwiched between the electrodes. It is effectively useful to expose terminals of these electrodes at the exterior of the liquid crystal cell by taking into consideration the connecting condition between these electrodes and the output terminals of an integrated circuit for delivering electric signals to a liquid crystal display pattern or the mounting condition of the liquid crystal cell on the substrate of the display device.

If use is made of a metal supporting member for mounting the liquid crystal cell on the display device substrate, there is a risk of the electrode terminals being shortcircuited by the metal supporting member.

In addition, in the twist type liquid crystal whose optical axis is rotated by 90° by the electrical field applied thereto, provision must be made for a polarizing plate and a reflecting plate for the purpose of improving contrast in the liquid crystal display. In this type of twist liquid crystal display device, heretofore, it has been the common practice to make the polarizing plate and reflecting plate equal in size to the glass plates. As a result, in case of incorporating the liquid crystal cell into the display device, metal fixtures are urged upon the polarizing plate so that that part of the polarizing plate which is covered by the metal fixture becomes useless. As a result, if the twist type liquid crystal is used in wrist watches, for example, whose size must be made small, the above described construction, which does not use available space, is not suitable.

In addition, the use of an adhesive agent by which the polarizing plate and reflecting plate are adhered to the glass plates results in the disadvantage of the adhesive agent protruding from the peripheral edges of the glass plates.

In general, a liquid crystal display timepiece preferably utilizes an oscillator and particularly a high precision crystal oscillator. Such crystal oscillation type timepieces have a high frequency and comprise an oscillator circuit, a frequency dividing IC circuit, a display decoder circuit, an electric source battery, an exterior control device and or the like. These devices have the disadvantage that it is difficult to provide a crystal oscillation type timepiece which is sufficiently thin in thickness and small in size if compared with the customary mechanical type timepiece. In addition, the size is increased by adding various kinds of devices, such as for example, an alarm device, a stop watch and chronograph is added to the crystal oscillation type timepiece. If the liquid crystal display cell, which is the largest among the constitutional elements of the timepiece except for its outer case, can be made small in size and thin, it is significantly beneficial to make the wrist watch small in size and, particularly to make the wrist watch thin. Moreover, the liquid crystal display cell must be replaceable by new one so that it must be strong, light in weight and thin in thickness.

As described above, when mounting the liquid crystal cell on the timepiece substrate, the connection between the exterior electrodes of the liquid crystal cell and the output terminals of the liquid crystal display driving circuit is effected. But, there is a risk of the connection between the exterior electrodes and the output terminals slipping after the liquid crystal cell has been mounted on the timepiece substrate. In addition, if the liquid crystal display ceases its normal operation, the liquid crystal cell must be removed from the timepiece in order to ascertain its fault. Moreover, an increase in number of displays such as hours, minutes, seconds, dates, week days and the like results in an increase in number of the exterior electrodes of the liquid crystal cell, and as a result, the above described disadvantage due to the slip of connection between the exterior electrodes and the output terminals becomes conspicuous.

In designing or manufacturing a liquid crystal display timepiece, heretofore, it has been well known that the life of the liquid crystal per se is far shorter than the life, reliability and the like of the electronic circuit and the like for driving the liquid crystal. As a result, a need arises to easily replace the liquid crystal cell with a new one. Thus, a number of liquid crystal display timepieces, in which the liquid crystal cell can be replaced by a new one, have been proposed. But, most of these liquid crystal display timepieces have encountered a difficult problem in that the replacement of the liquid crystal cell by a new one becomes troublesome as the electrical connection between the exterior electrodes and the output terminals of the electronic circuit must reliably be effected. For example, the liquid crystal cell could not be removed from the timepiece substrate unless all of screws are loosened and removed from the metal fixtures for securing the liquid crystal cell to the timepiece substrate.

Needle type wrist watches have recently been intended to follow the latest fashions and become colorful. It is also desirous that the liquid crystal display wrist watches follow the latest fashions and become colorful. Particularly, it is desirous to provide many varieties of boundary plates for the liquid crystal wrist watch, as is the case with many varieties of dial plates for the needle type wrist watch. But, the conventional boundary plate is composed of a mask printed on the lower surface of a protective glass cover or is made integral with the liquid crystal cell so that the conventional boundary plate could not be separated from the liquid crystal cell, and as a result, it is difficult to provide many varieties of boundary plates for the liquid crystal display wrist watches.

In addition, it has also been proposed to use voltage so as to change the color of the liquid crystal. But, such means is not used in practice. It is also possible to change the color of the liquid crystal of the twist type liquid crystal display timepiece by selecting the color of the upper and lower polarizing plates. But, such colored polarizing plates must be manufactured in a manner which is easier than the method of manufacturing the dial plate and must have a polarizing property. As a result, the kinds of polarizing plate which are usable for colored polarizing plates are limited in number. In addition, the polarizing plate is secured to the glass plate by means of the adhesive agent so that a selection of the color of the upper and lower polarizing plates results in a need to alter the display device as a whole. As a result, the kinds of polarizing plates which are usable as the colored polarizing plate, are also limited in number.

SUMMARY OF THE INVENTION

An object of the invention is to provide a liquid crystal display wrist watch which can simply mount a liquid crystal cell on a wrist watch substrate without degrading the mounting precision.

Another object of the invention is to provide a liquid crystal display wrist watch which makes use of a twist liquid crystal and hence a polarizing plate and a reflecting plate and in which both the polarizing plate and the reflecting plate are adhered at their outer periphery to a glass plate, and to provide such a watch which can provide a material increase in yield, and can provide an aligned relative position between the glass plate and the reflecting plate without blurring the glass plate with printing ink.

A further object of the invention is to provide a liquid crystal display wrist watch in which, between a liquid crystal cell and a supporting frame a buffer is sandwiched which can reliably effect connection between external electrodes of the liquid crystal cell and output terminals of a liquid crystal driving electronic circuit and which can prevent the liquid crystal cell from being broken by shocks applied thereto.

An additional object of the invention is to provide a liquid crystal display wrist watch in which exterior electrodes of a liquid crystal cell and output terminals of a liquid crystal cell driving electronic circuit are made of a contact metal which is capable of preventing an occurrence of potential difference across the contact between the exterior electrodes and the output terminals.

Another object of the invention is to provide a liquid crystal display wrist watch in which the width of each of a group of parallel exterior electrodes of a liquid crystal cell is made narrower than the width of each of a group of parallel output terminals of a liquid crystal driving electronic circuit and which can easily effect the connection between the respective exterior electrodes and the respective output terminals without making any defective shorts at the connection.

Another object of the invention is to provide a liquid crystal display wrist watch in which exterior electrodes of a liquid crystal cell are spaced apart from the outer peripheral edge of the liquid crystal cell, which can make use of a metal supporting frame without shortcircuiting it with the exterior electrodes, and which can make the liquid crystal cell smaller.

A further object of the invention is to provide a liquid crystal display wrist watch in which a user can visually observe from the outside of the wrist watch the condition of the connection between exterior electrodes of a liquid crystal cell and output terminals of a liquid crystal cell driving electronic circuit.

Still a further object of the invention is to provide a liquid crystal display wrist watch in which one can easily replace a liquid crystal cell by a new one by loosening screws used to secure the liquid crystal cell through a fixture to a wrist watch substrate.

Another object of the invention is to provide a liquid crystal display wrist watch which comprises a boundary plate or a color filter sandwiched between a protective glass cover and a liquid crystal cell and in which many varieties of design for the wrist watch are possible.

BRIEF DESCRIPTION OF THE DRAWINGS

FIG. 3 is a section taken on line III — III of FIG. 1, parts being shown in an enlarged scale;

DETAILED DESCRIPTION OF PREFERRED EMBODIMENTS

Figure 1:
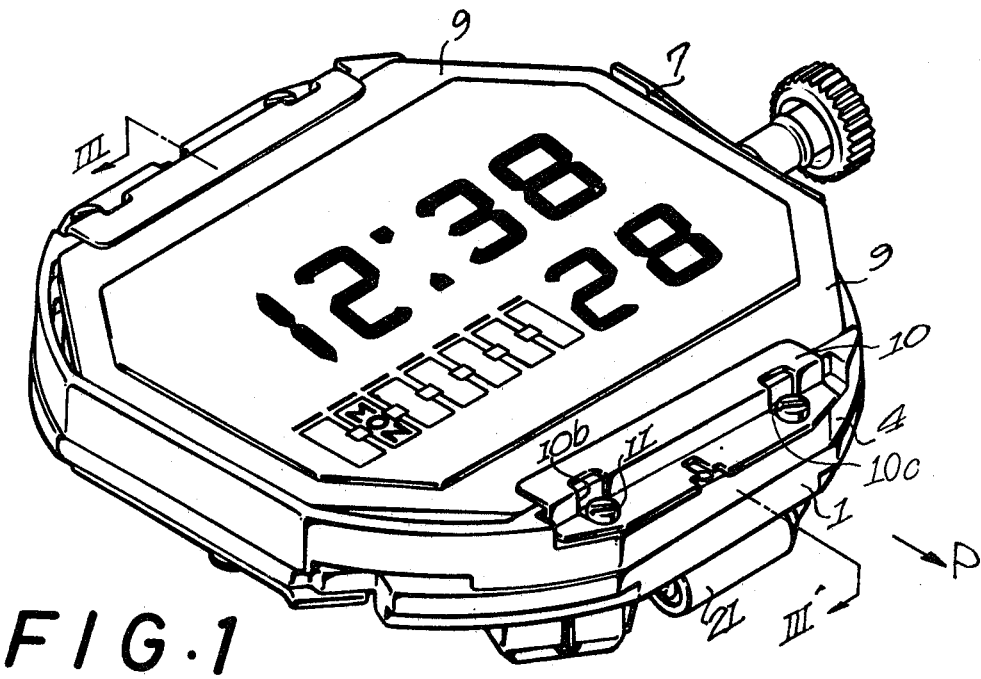
FIG. 1 is a perspective view of a liquid crystal display wrist watch according to the invention, with an outer case removed.

FIG. 1 is a perspective view showing one embodiment of the invention.

Figure 2:
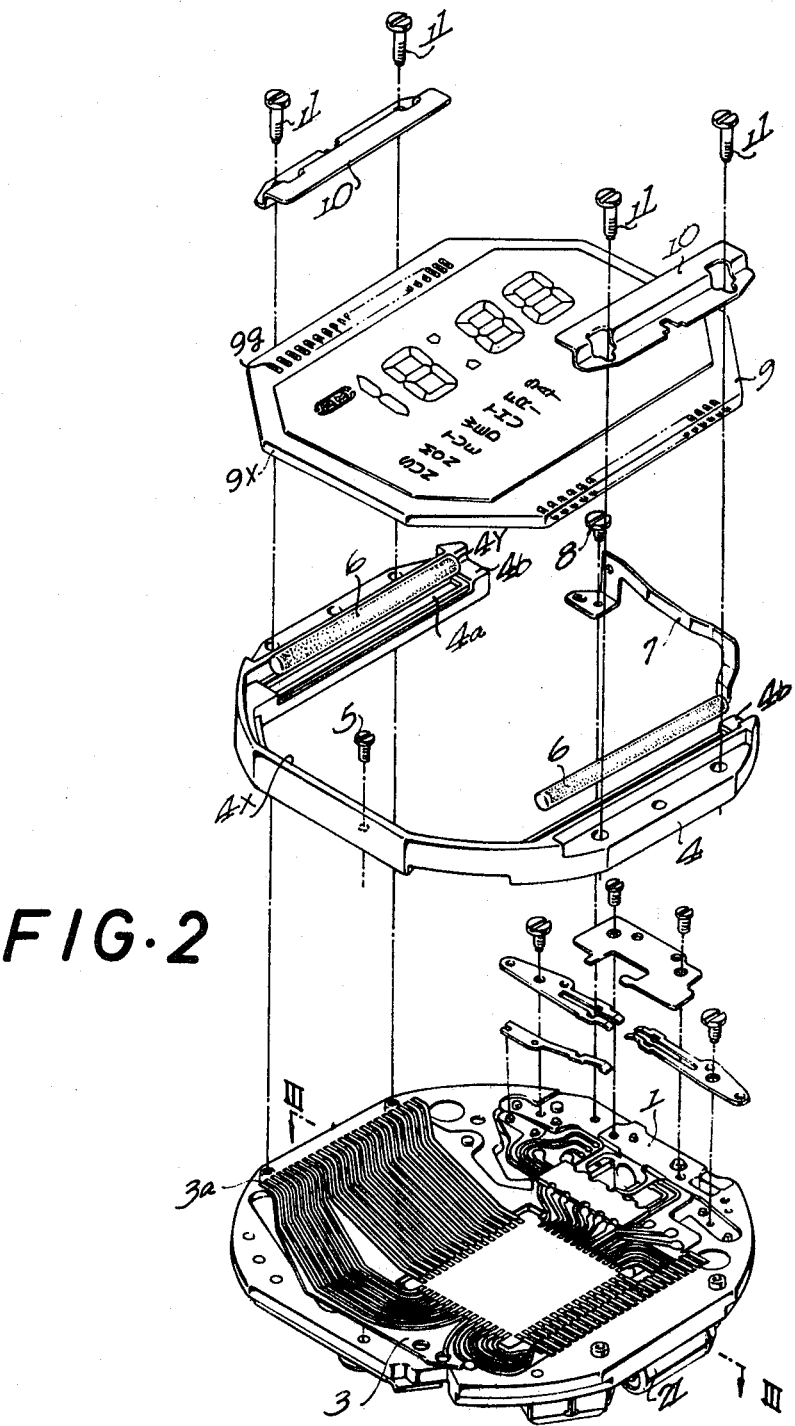
FIG. 2 is an exploded view in perspective of the wrist watch shown in FIG. 1.

As shown in FIGS. 2 and 3, a substantially disc shaped substrate 1 of a wrist watch according to the invention is secured to a C-shaped liquid crystal cell supporting frame 4 by means of a screw 5. The liquid crystal cell supporting frame 4 is provided at its inside with a recessed portion 4a which comprises a land adapted to enclose a round bar-shaped resilient body 6. The wrist watch substrate 1 is secured to a spring member 7 by means of a screw 8. The spring member 7 is composed of a bent resilient leaf or plate spring and is urged against the side of a liquid crystal cell 9.

The liquid crystal supporting frame 4 is provided at its inside with a stepladder shaped portion 4b having two parallel planes spaced from each other and adapted to be engaged with connecting portions 3a of a flexible printed circuit or print sheet 3. On the connecting portions 3a are superimposed several glass plates on which is disposed a liquid crystal cell 9 on which are suitably arranged a liquid crystal, electrodes and the like. The liquid crystal cell 9 is urged against the liquid crystal cell supporting frame 4 by means of the spring member 7 and is secured through the liquid crystal supporting frame 4 to the substrate 1 by means of a cell holding frame plate 10 and screws 11. The cell holding frame plate 10 is composed of a stepladder shaped frame having two parallel planes separated from each other. This arrangement is clearly shown in FIG. 3. All of independent parts in FIG. 2 with no reference numerals are parts for use in switches.

The liquid crystal cell supporting frame 4 is also provided with inside wall surfaces 4x and 4y which provide references of x and y axes crossing perpendicularly to each other and providing references for determining the position of the liquid crystal cell electrodes. The positions of electrodes 9a of the liquid crystal cell and electrodes of the flexible print plate 3a are determined on the base of these reference inside walls 4x, and 4y.

Figure 4:
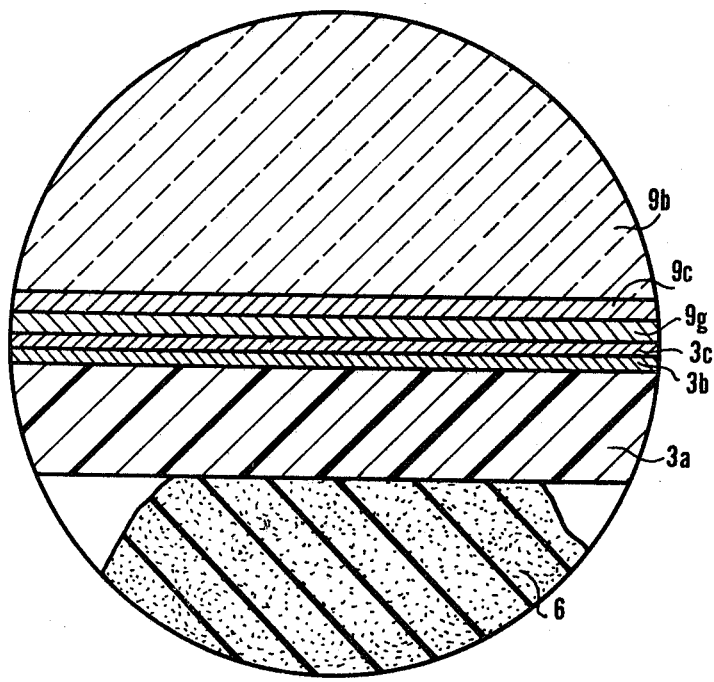
FIG. 4 is an enlarged view of parts surrounded by a circle shown in FIG. 3.

As shown in FIG. 4, the electrodes 9g are formed on the lower surfaces of the upper glass 9b of the liquid crystal cell. These electrodes 9g are manufactured with reference to outside surfaces 9x of the upper glass plate 9b and the electrodes 3c of the flexible plate 3a are arranged with reference to the inside wall 4x of the liquid crystal cell supporting frame 4.

Figure 5:
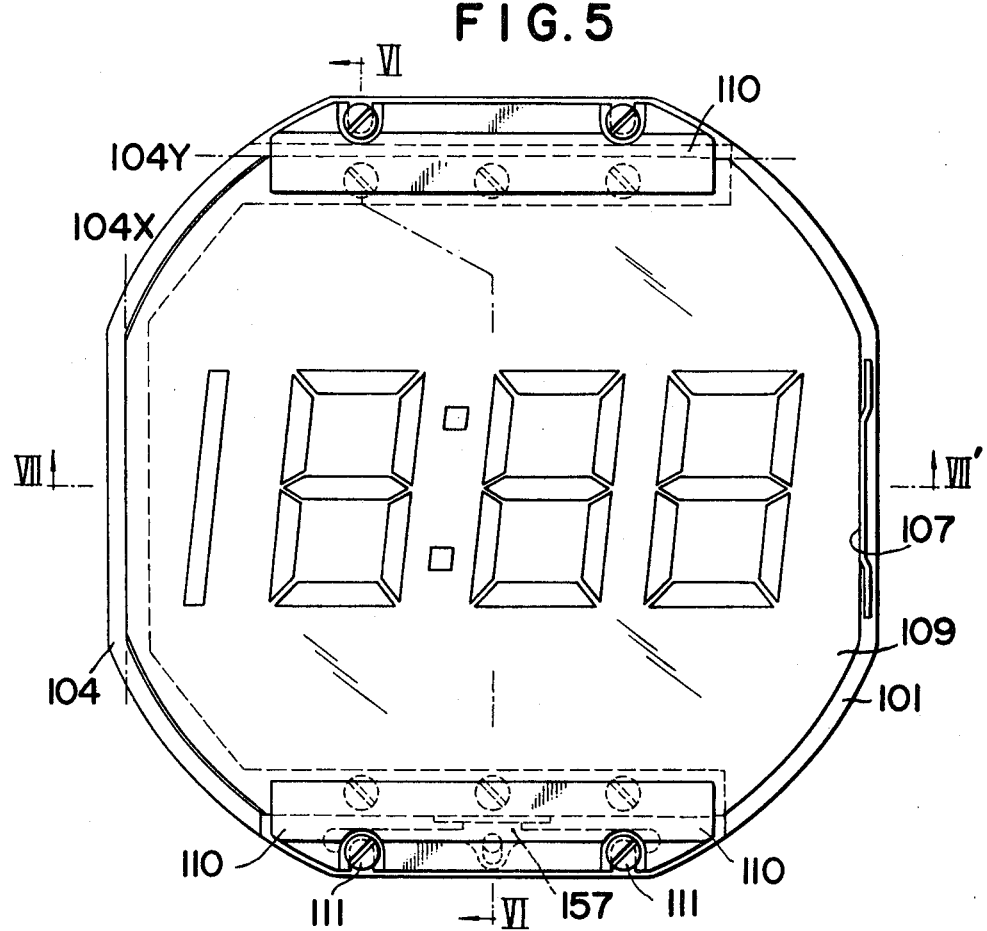
FIG. 5 is a top plan view of another embodiment of the liquid crystal cell shown in FIG. 1.
Figure 6:
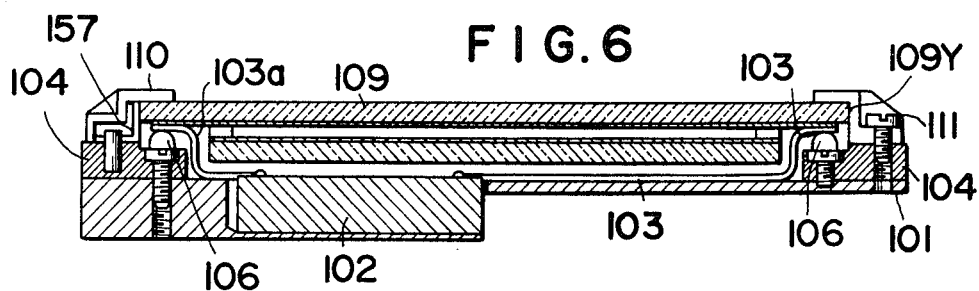
FIG. 6 is a section taken on line VI — VI of FIG. 5.
Figure 7:
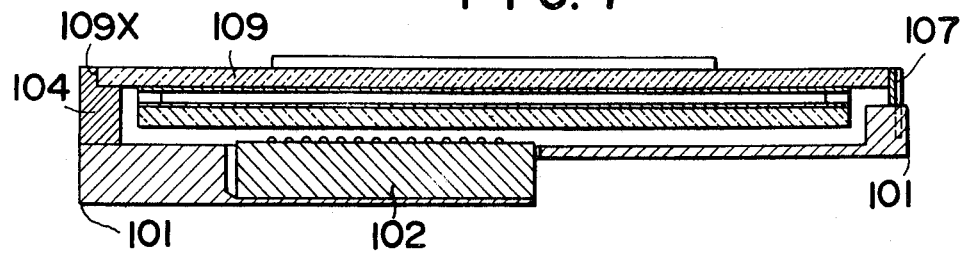
FIG. 7 is a section on line VII — VII of FIG. 5.

In the modified embodiment shown in FIGS. 5, 6 and 7, for the sake of completely determining the position of the upper glass plate of the liquid crystal cell, two perpendicularly crossing inside wall surfaces 104x, 104y of the liquid crystal supporting frame 104 are used as reference surfaces and provision is made with two spring members 107 and 157, which improve precision in both the longitudinal and traverse directions of the upper glass plate.

In the embodiment shown in FIGS. 5, 6 and 7, substantially like parts to those shown in FIG. 3 are designated by reference numerals added with 100. In the present embodiment, the second spring member 157 is provided for the previous embodiment is composed of an L-shaped resilient metal piece provided at its both sides with two resilient arms and at its center with an elongate hole engageable with a position determining pin.

As shown in FIGS. 2, 3 and 4 the wrist watch substrate 1 is sandwiched between an electric supply battery 27, a crystal oscillator 21 serving as a time standard, and an electronic circuit 2 for driving a display device by means of signals delivered from the crystal oscillator 21 on the one hand and a twist type liquid crystal cell 9 serving as an electronic optical display device on the other hand.

The liquid crystal cell 9 is of a twist type composed of an upper polarizing plate 9a, a lower polarizing plate 9k, an upper glass plate 9b, a lower glass plate 9h and a liquid crystal (not shown in FIG. 3) sandwiched between the upper and lower glass plates 9b, 9h. As shown in FIG. 4, the upper glass plate 9b is provided at its lower surface with exterior electrodes 9g which are urged against the wrist watch substrate 1 by means of the frame plate 10 for the purpose of electrically connecting the electrodes 9b to lead terminals 3c of the electronic circuit 2 mounted on the substrate 1.

In the embodiment shown in FIGS. 5, 6 and 7 the position of the upper glass plate 109 is determined by urging the reference outside wall surfaces 109x, 109y of the upper glass plate 109 against the reference inside wall surfaces 104x and 104y of the supporting frame 104 by means of the spring members 107 and 157, respectively. Provision is made of holding frame plates 110 and resilient bodies 106 provided for the wrist watch substrate 101 for the purpose not only of urging the upper glass plate 109 against the supporting frame 104 but also of effecting connection between the electrodes 109g of the liquid crystal cell and the wiring 103 of the integrated circuit 102 for delivering time display signals.

In order to simplify the construction shown in FIGS. 5, 6 and 7, the spring member 157 may be omitted by putting the stress on mounting precision in pitch direction of the electrodes 109g (right and left directions in FIG. 5). In this case, the upper glass plate 109 may be held in the supporting frame 104 with an allowable gap formed therebetween by means of the upper and lower holding frame plates 110-110 which are the same in construction. Such allowable gap tends to displace the liquid crystal cell in upper and lower directions. In this case, the liquid crystal cell 109 is moved in such a direction that the wiring 103 of the integrated circuit 102 does not slip from the electrodes 109g and hence such movement is not a vital defect.

On the contrary, left and right directions in FIG. 5 correspond to the pitch direction of the electrodes 109g and the wirings 103a so that a slightest movement results in a displacement and interruption between the wirings 103 and the electrodes 109g. There is also a risk of the wirings 103 being shortcircuited by the electrodes 109g. Thus, it is preferable to use the two reference side wall surfaces. But, as described above, only one reference side wall surface may be used in practice in a manner such that no pich displacement occurs between the electrodes 109g and the wirings 103a.

As stated hereinbefore, the invention makes use of such construction that either one or two side surfaces in x axis and y axis directions of a liquid crystal supporting frame and corresponding one or two side surfaces of a glass plate of a liquid crystal cell are formed with a precision that the side surface or side surfaces constitutes or constitute reference side surface on the basis of which the position of the liquid crystal cell is determined. As a result, the invention has the advantage that that part of the glass plate which is required to make a precise fit is made as small as possible and that the liquid crystal cell is mounted on the wrist watch substrate in an easily detachable manner without degrading precision.

The construction of the liquid crystal cell 9 shown in FIGS. 1, 2 and 3 will now be described in greater detail with reference to FIGS. 8 to 12.

Figure 8:
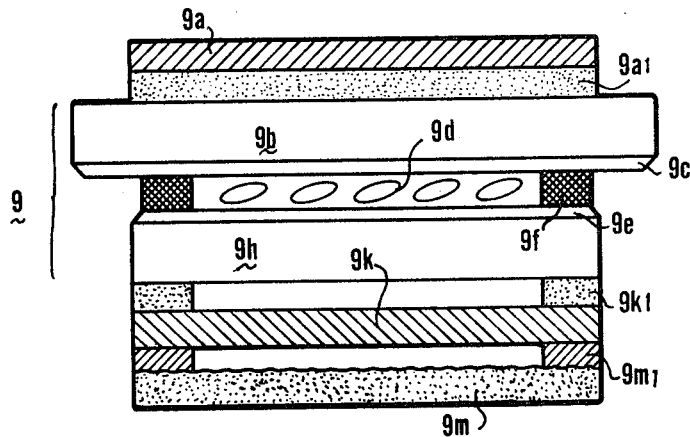
FIG. 8 is an enlarged section of the liquid crystal cell according to the invention.

Referring to FIG. 8 which shows in section, the liquid crystal cell according to the invention, reference numeral 9d designates a liquid crystal, material 9c, 9e transparent electrodes, 9b, 9h upper and lower or first and second glass plates, 9a, 9k upper and lower or first and second polarizing plates, 9a1 a totally adhering layer, 9m a rear reflecting plate or surface, and 9K1, 9m1 outer periphery adhering layers.

Figure 9:
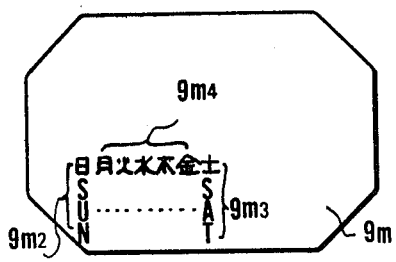
FIG. 9 is a top plan view of the reflecting plate of the liquid crystal cell according to the invention.

In the construction shown in FIG. 8, the outer periphery adhered layer 9m1 sandwiched between the lower polarizing plate 9k and the rear reflecting plate 9m forms a space therebetween, and as a result, it is possible to obviate defective causes due to bubbles, dust and the like occluded into the totally adhered layer of the reflecting plate which have been encountered with the prior art construction. In addition, the rear reflecting plate 9m may be printed with a red color 9m2, blue color 9m3, black color 9m4 and the like as shown in FIG. 9. In this case, the absence of the totally adhered layer results in an elimination of the print blur caused by it. Thus, it is possible to make the reflecting plate 9m colorful.

Figure 10:
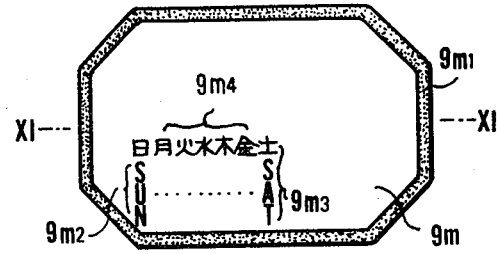
FIG. 10 is a plan, view of the reflecting plate shown in FIG. 9 with an adhesive agent adhered on the peripheral edge thereof.
Figure 11:
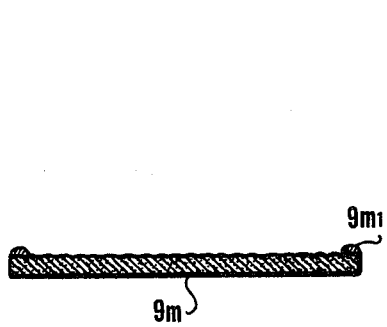
FIG. 11 is a section when on line XI — XI of FIG. 10.
Figure 12:
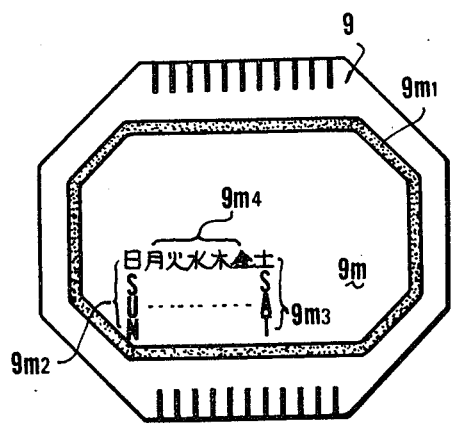
FIG. 12 is a top plan view of the liquid crystal cell according to the invention.

In FIGS. 9 to 12 are shown embodiments of the invention applied to a wrist watch. As above described, the reflecting plate 9m showing in FIG. 9 is printed with week days in three different colors. FIG. 10 is a plan view of the reflecting plate 9m with an outer periphery adhered layer 9m1 screen printed thereon by means of an epoxy resin adhesive agent. FIG. 11 is a section on line XI — XI of FIG. 10. FIG. 12 shows the rear reflecting plate 9m adhered to the liquid crystal cell 9.

As shown in FIG. 8, the lower polarizing plate 9k and the reflecting plate 9m are adhered together by means of the outer periphery adhering layer 9m1, which has a thickness of about $5\mu$ to $20\mu$ to form a free space therebetween having a thickness of about $5\mu$ to $20\mu$. As a result, there is no parallel plane layer between the lower polarizing plate 9k and the rear reflecting plate 9m and hence no defective fringes occur. In the present embodiment, the lower glass plate 9h and the lower polarizing plate 9k are also adhered together by means of the outer periphery adhering layer 9k1 so as to form a free space therebetween which is sufficient to prevent defective fringes.

As stated hereinbefore, the use of the reflecting plate adhered at its outer periphery to the polarizing plate which is in turn adhered at its outer periphery to the glass plate ensures an elimination of bubbles, dust and the like from the adhering layer and of occurrence of fringes which have been encountered with the total surface adhering layer and provides the important advantage that it is possible to effect colorful printing on the reflecting plate.

The construction for supporting the liquid crystal cell will now be described with reference to FIG. 3. Between the liquid crystal cell holding frame plate 10 and the liquid crystal cell 9 is sandwiched a rubber packing 10a. The rubber packing 10a may be made of liquid rubber coated on the liquid crystal cell holding frame plate 10 or on the liquid crystal cell 9, and then is made rubbery and physically adhered. Alternatively, a suitably shaped rubber packing 10a may be sandwiched between the liquid crystal cell holding frame plate 10 and the liquid crystal cell 9 as shown in FIG. 3. The coated rubber packing 10a makes the assembling easy, but makes the thickness in plane direction irregular. If the liquid crystal cell holding frame plate 10 is secured to the wrist watch substrate 1 by means of screws 11, the round bar-shaped resilient body 6 is compressed such that the connection between the connection terminals 9g of the liquid crystal cell 9 and the terminals 3a of the print circuit substrate 3 is reliably effected. In addition, the rubber layer 10a sandwiched between the liquid crytal cell 9 and its holding frame plate 10 prevents the liquid crystal cell 9 from being subjected to local loads due to unbalance of the screw driving torque or due to lack of uniformity of various parts, thereby stabilizing the liquid crystal cell 9 and preventing the liquid crystal cell 9 from being broken due to shocks and the like subjected to it.

As stated hereinbefore, the invention has the advantage that the liquid crystal cell is prevented from being broken and that provision may be made of highly reliable electrical connections.

The construction of the connection between the liquid crystal cell 9 and the flexible print sheet 3 will now be described with reference to FIGS. 3, 4 and 8. As above described, the liquid crystal cell 9 is composed of upper and lower glass plates 9b and 9h, electrodes 9c and 9e made of indium oxide vapor deposited on the upper and lower glass plates 9b and 9h, respectively, a spacer 9f made of an insulating material, and a liquid crystal 9d. The upper glass plate 9b is made larger than the lower glass plate 9h. That surface portion of the electrode 9c which is not opposed to the lower glass plate 9h is vapor deposited with gold to form an exterior electrode 9g as shown in FIG. 4.

Output terminals of a liquid crystal driving circuit (now shown) such, for example, as contact portions 3c are made of gold vapor deposited on electric conductive parts of the flexible print sheet 3. These output terminals 3c are superimposed beneath the exterior electrodes 9g to connect the liquid crystal 9 to its driving circuit. If the liquid crystal cell holding frame plate 10 is secured to the wrist watch substrate 1 by means of the screws 11, the upper glass plate 9b is urged against the resilient body 6, and as a result, not only the electrical connection between the liquid crystal cell 9 and its driving circuit is established, but also the liquid crystal cell 9 is supported by the wrist watch substrate 1.

As described above, if the contact between the exterior electrodes of the liquid crystal cell and the output terminals of the liquid crystal driving circuit is made of an element selected from the group consisting of gold, platinum, silver and paradium, no potential difference due to oxidation of the contact occurs and the contact is not corroded and can reliably connect the exterior electrode of the liquid crystal cell to the output terminals of the liquid crystal driving circuit.

Figure 13:
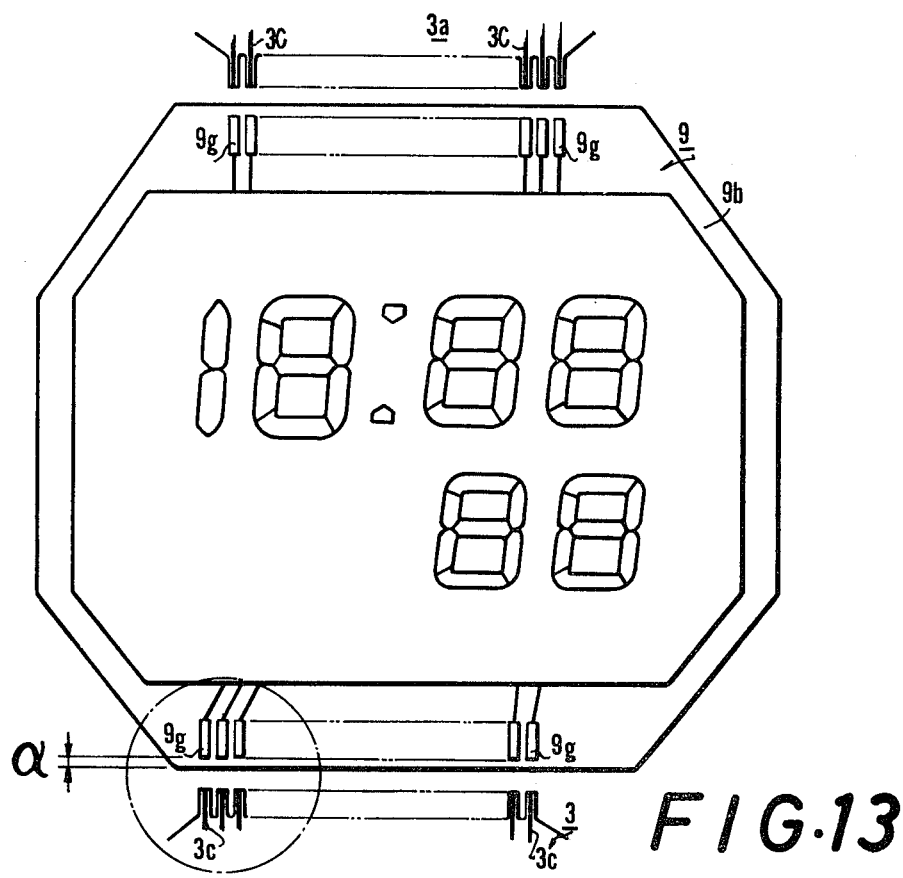
FIG. 13 is a top plan view illustrating the relative arrangement between the exterior electrodes of the liquid crystal cell according to the invention and the output terminals of the liquid crystal cell driving electronic circuit.

FIG. 13 is a plan view showing the connection construction of the liquid crystal cell. The upper glass plate 9b of the liquid crystal cell is provided on its upper surface with minute exterior electrodes 9g vapor deposited thereon in parallel with each other. The flexible insulating sheet 3 made, for example, of polyimide resin and the like is provided on its upper surface with copper foil laminated thereon on which is plated with connected terminals 3c made of the contact metal. This construction is so-called flexible print sheet. The parallel exterior electrodes 9g are connected to segment electrodes (not shown) of the liquid crystal cell and the connection terminals 3c are connected to the liquid crystal cell driving circuit.

In almost all cases, the parallel exterior electrodes 9g are manufactured by vapor deposition method. These parallel exterior electrodes 9g are highly precise in dimension. It is possible to separate the parallel exterior electrodes 9g one from the other by a distance on the order of a one micron unit. On the contrary, the connection terminals 3c are customarily manufactured by press and etching technique so that their dimensional precision is not as good as expected. In addition, the connection terminals 3c and the flexible print sheet 3 are deformed and contact is made with the parallel exterior electrodes 9g, and as a result, there is a risk of the connection terminals 3c being shortcircuited if the distance between adjacent connection terminals 3c becomes too short. Each of the connection terminals 3c may be deformed independently from the other.

Figure 14:
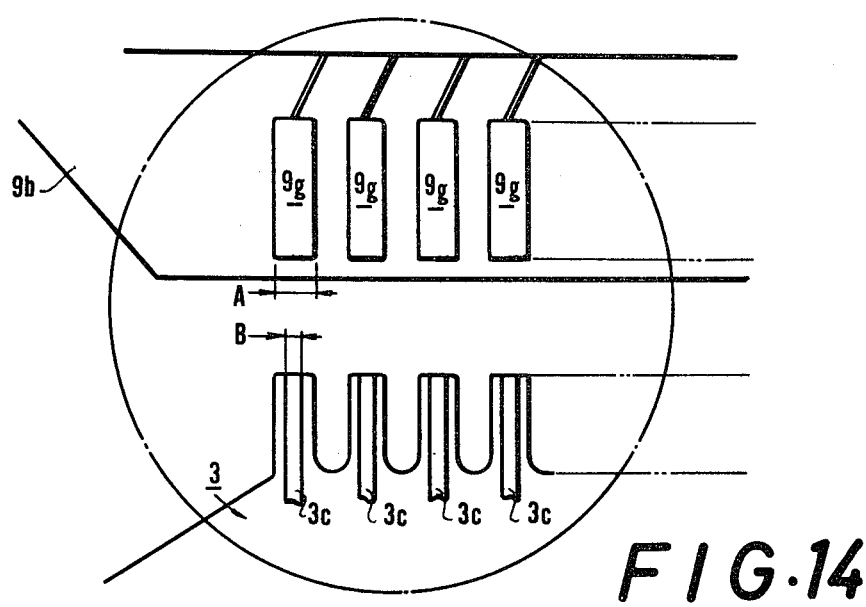
FIG. 14 is a partial enlarged plan view of parts surrounded by a circle shown in FIG. 13.

FIG. 14 shows that part of the liquid crystal cell 9 which is enclosed by a circle shown in FIG. 13 in enlarged scale. A feature of the invention is the provision of connection terminals 3c whose width B is made thinner than the width A of each of the parallel exterior electrodes 9g.

Alternatively, each of the connection terminals 3c may be made of a metal spring whose width B is thinner than the width A of each of the parallel exterior electrode 9g.

As seen from the above, the invention provides a liquid crystal cell display device which is very simple in construction and permits of displacement and deformation of the connection terminals in more or less extent and which is reliable in operation without occurring troubles.

The electrodes of the liquid crystal cell will now be described with reference to FIGS. 3, 4 and 14.

If the substrate 1 or the supporting frame 4 is made of metal, there is a risk of the terminals 9g of the transparent electrodes 9c being short-circuited with the supporting frame 4. In addition, if the terminals 9g terminate at the end surface of the liquid crystal cell 9, the terminals 9g are liable to be turned up which makes the handling of the wrist watch difficult. In order to avoid such shortcircuit between the terminals 9g of the transparent electrode 9c and the supporting frame 4 and also avoid such turn up of the terminals 9g, the invention provides a gap a between the end surface of the upper glass plate 9b and the respective ends of the terminals 9g.

As stated hereinbefore, the use of the liquid crystal cell according to the invention provides its supporting frame made of a strong metal and a display device which is highly reliable in operation without moving the liquid crystal cell due to external vibration, shock and the like and which can detachably mount the liquid crystal cell in an extremely easy manner.

The mechanical construction of the liquid crystal cell will now be described with reference to FIGS. 3, 4 and 8.

In the embodiment shown in FIG. 3, the upper polarizing plate 9a is made smaller than the upper glass plate 9b and both the lower polarizing plate 9k and the rear reflecting plate 9m are made smaller than the lower glass plate 9h.

In the case of assembling the liquid crystal cell shown in FIG. 3 with the substrate 1, the supporting frame 4 is secured to the substrate 1 and then the liquid crystal cell 9 is secured to the supporting frame 4 and the wirings 3b from the integrated circuit 2 are connected at their connection terminals 3c to the transparent electrodes 9c. In this case, the upper glass plate 9b is urged against the wirings 3 contrary to the prior art construction in which the upper polarizing plate 9a is urged downwardly, and as a result, the liquid crystal cell 9 can be made thinner than that of the prior art construction by the thickness of the upper polarizing plate 9a.

In addition, if use is made of the upper and lower glass plates having the same dimension, the liquid crystal cell 9 may be made thinner than that of the prior art construction by the thickness of the upper and lower polarizing plates and of the rear reflecting plate.

If the lower polarizing plate 9k and the rear reflecting plate 9m are adhered to the lower glass plate 9h by means of the adhering agents 9k1, 9m1, respectively, the adhering agents 9k1, 9m1 are liable to be protruded from the periphery of the lower glass plate 9h. The invention can obviate such disadvantage by making the lower polarizing plate 9k and the rear reflecting plate 9m smaller than the lower glass plate 9h.

As described above with reference to FIG. 3, the liquid crystal cell 9 as a whole is mounted on the substrate 1 with the aid of the holding frame plate 10 urged against the upper glass plate 9b only. As a result, the upper glass plate 9b only may be made strong enough to withstand the stress subjected thereto. On the contrary the lower glass plate 9h may have a stength which is sufficient to support the liquid crystal material (see FIG. 8) 9d sandwiched between the upper and lower glass plates 9b, 9h.

Thus, the invention provides a display device which is small in type and thin in thickness, which can make the thickness of wrist watches thin, and which can make the thickness of the lower glass plate 9h thinner than that of the upper glass plate 9b.

In the total effect type twist liquid crystal cell according to the invention shown in FIG. 3, the thickness of the lower glass plate 9h is made thinner than that of the upper glass plate 9b and the liquid cell 9 is supported by the supporting frame 4 with the aid of the upper glass plate 9b which is comparatively thick. Such construction as shown in FIG. 3 is effectively applicable to a thin type liquid crystal wrist watch and is capable of making the liquid crystal display cell light in weight and the supporting glass plate so strong that there is no risk of the supporting glass plate being broken by shocks and the like applied to it.

As above described, in accordance with the invention, provision is made of a plurality of exterior electrodes 9g by vapor depositing gold and the like on that surface of the transparent electrode 9c of the upper glass plate 9b which is not opposed to the lower glass plate 9h. The output terminals of the liquid crystal cell driving circuit such, for example, as the connection terminals 3c of the flexible print sheet 3 are superimposed upon the exterior electrode terminals 9g and the liquid crystal holding frame plate 10 is secured to the wrist watch substrate 1 by means of the screws 11. As a result, the upper glass plate 9b is urged against the resilient body 6, thereby not only effecting the electrical connection between the output terminals 3c of the integrated circuit 2 and the exterior electrodes 9g but also supporting the liquid crystal cell 9 by the substrate 1.

In the above described liquid crystal cell supporting construction, the condition of the connection between the exterior electrodes 9g of the liquid crystal cell 9 and the output terminals 3c of the electronic circuit 2 can be ascertained by a user when he looks at the connection in a direction E shown in FIG. 3 without being hindered by the liquid crystal cell holding frame plate 10.

Thus, the liquid crystal cell supporting construction according to the invention has the advantage that the user can ascertain the connection condition between the exterior electrodes of the liquid crystal cell and the output terminals of the liquid crystal display driving circuit after the liquid crystal cell has been assembled.

As shown in FIG. 1, the liquid crystal cell holding frame plate 10 is provided at its stopped portion with a window 10b having a width which is larger than the diameter of the head of the screw 11 and at its lower horizontal portion with a window 10c having a width which is larger than the diameter of the threaded stem of the screw 11 and communicated with the large window 10b, thereby constituting an escape window or keyhole slot. As is shown in FIG. 1, the position of the liquid crystal cell 9 is determined relative to a given position by means of the supporting frame 4. On this liquid crystal cell 9 is disposed the holding frame plate 10 which is then secured to the wrist watch substrate 1 by means of the screws which are retained in keyhole cut-outs in the holding frame plate 11, and as a result, the liquid crystal cell 9 is made stationary at its precise position. If it is desired to remove the liquid crystal cell 9 from the substrate 1, the screws 11 are loosened which permits the liquid crystal cell holding frame plate 10 to displace in a direction shown by an arrow P in FIG. 1 for removal from the liquid crystal cell 9. Then, the liquid crystal cell 9 can be removed from the substrate 1.

As is readily seen, each holding frame plate 10 has a first flange which overlies the liquid crystal display 9, and a second flange which is parallel to the first flange and joined thereto by a web, which is normal to both the first and second flange. The supporting frame has a notch with one surface parallel to the liquid crystal cell and the other surface perpendicular to the first surface. The second flange of the holding frame plate can rest on the parallel surface while the web of the holding flange member abuts the perpendicular surface of the supporting frame. The keyhole slot has a wide portion which extends through the web and a narrow portion which extends in the second flange so that the holding frame plate may be slid away from overlying relationship with the liquid crystal display.

In addition, the liquid crystal cell 9 may easily be secured to the substrate 1 by effecting the above described steps in a reverse order.

The use of the escape window 10c shown by dotted lines in FIG. 1 is capable of detachably mounting the liquid crystal cell holding frame plate 10 on the liquid crystal cell 9 by only loosening the screws 11. In addition, the liquid crystal cell 9 is made stationary by means of the liquid crystal cell holding frame plate 10 positively secured by screws to the substrate 1, so that there is no risk of the liquid crystal cell 9 being moved in position by vibrations, shocks and the like subjected thereto.

An outer case associated with the liquid crystal cell 9 will now be described with reference to FIGS. 15, 16, 17 and 18.

Figure 17:
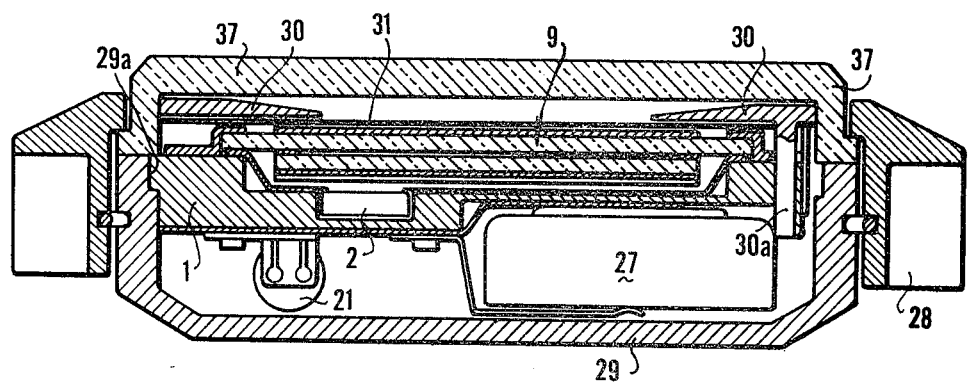
FIG. 17 is a section taken on line XVII — XVII of FIG. 15.

As is shown in FIG. 17, the movement shown in FIG. 1 is enclosed in a case composed of a protective glass cover 37, a sleeve or barrel 28 and a rear cover 29. Between the protective glass cover 37 and the liquid crystal cell 9 of the movement are freely inserted a boundary plate 30 and a color filter 31, with an allowable gap formed in up and down directions, respectively.

Figure 15:
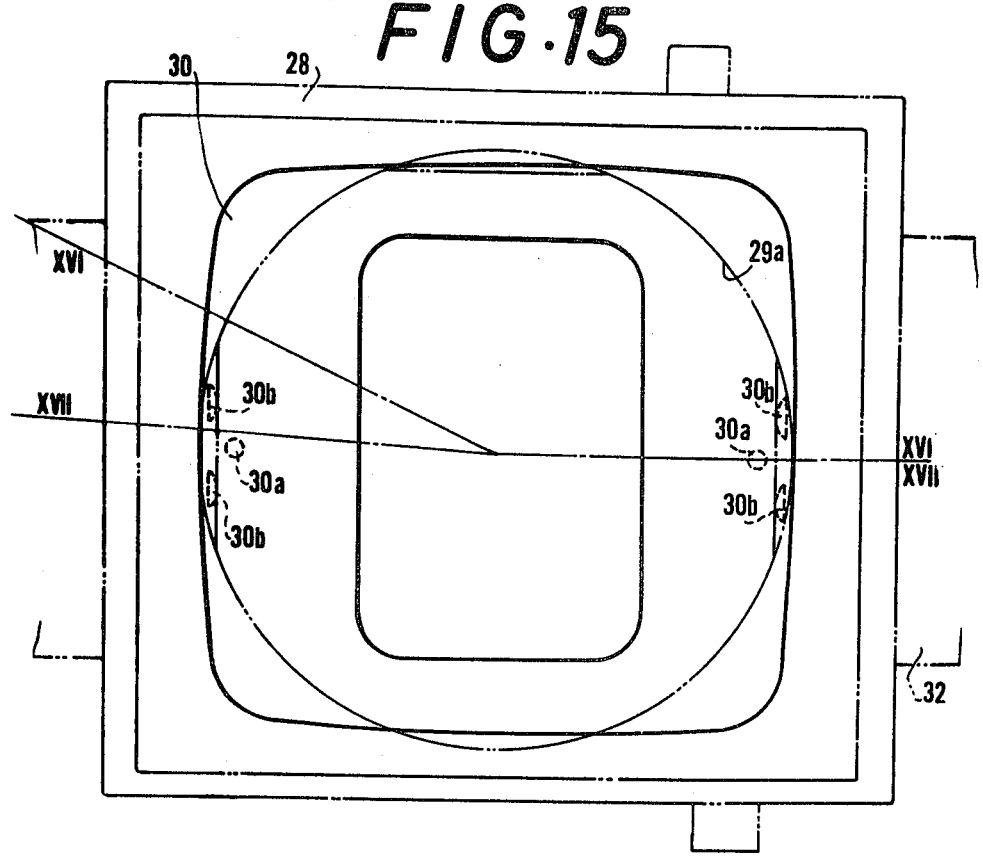
FIG. 15 is a plan view showing a boundary plate and an outer case according to the invention.
Figure 16:
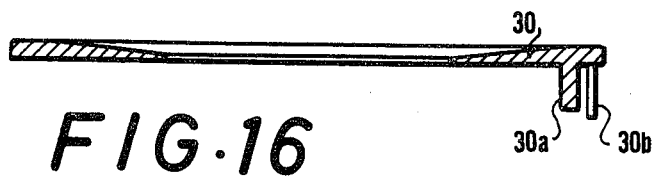
FIG. 16 is a section taken on line XVI — XVI of FIG. 15.

The boundary plate 30 is provided at its diametrically opposite portions with two position determining legs 30a which can determine the position of the boundary plate 30 in plane direction with respect to the movement, thereby maintaining a relative position with the liquid crystal cell 9 supported by the movement at the position determined by the movement. The boundary plate 30 is formed into a shape shown in FIGS. 15 and 16. FIG. 15 is a plan view of the boundary plate 30 and FIG. 16 is its cross sectional view. As above described, the boundary plate 30 is arranged in a space formed between the movement and the outer case with gaps which permit the boundary plate 30 to move up and down directions. The position of the boundary plate 30 in plane direction is determined by the legs 30a. In addition, the boundary plate 30 can temporarily be supported by the movement only with the aid of the legs 30a resiliently engaged with the movement.

The rear cover 29 may be provided at its inner peripheral edge with a shoulder 29a which receives the substantially disc shaped substrate 1. Then, the boundary plate 30 is disposed on the liquid crystal cell 9 and the legs 30a are inserted into circular holes provided for the substrate 1 so as to determine the position of the boundary plate 30 in plane direction and lunar shaped legs 30b are urged against the outer periphery of the substrate 1. Reference numeral 32 designates a band secured to the barrel 28.

The movement for supporting the liquid crystal cell 9 is inserted into the rear cover 29, then, the boundary plate 30 with the color filter 31 previously mounted thereon are disposed on the movement and subsequently the protective glass cover 27 and the barrel 28 are assembled in succession to complete a wrist watch. After the wrist watch has been completed, if it is desired to replace the boundary plate by another one in order to change the display condition, the barrel 28, protective glass cover 37 and boundary plate 30 can be removed in reverse order. Thus, the boundary plate 30 can easily be replaced by another one without removing the movement from the rear cover 29. Such replacement of the boundary plate 30 renders it possible to make the exposed area of the liquid crystal cell 9 as large as possible. As a result, the numerical letters for displaying times can be made large, thereby facilitating the design in an advantageous condition.

Figure 18:
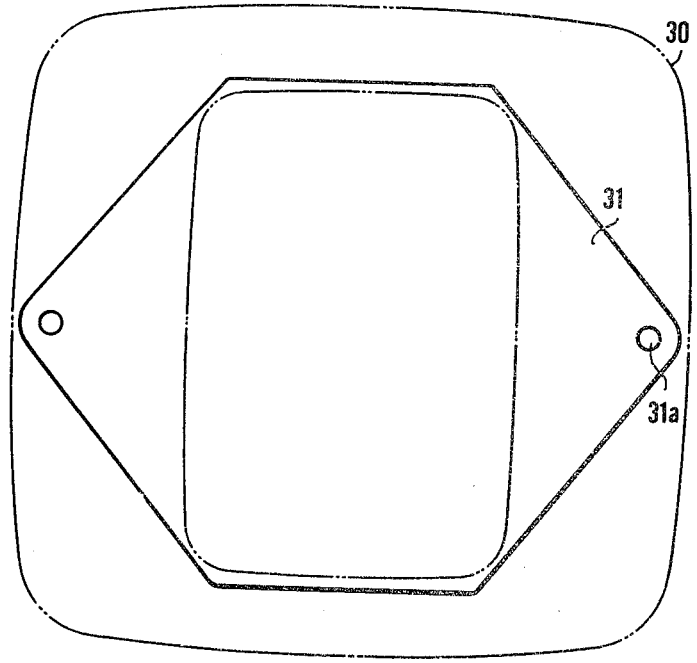
FIG. 18 is a plan view showing the relation between the boundary plate and the color filter according to the invention.

In FIG. 18, the color filter 31 is shown by a full line and the boundary plate 30 is shown by two dotts and dash lines. The color filter 31 is made of a thin sheet and formed into a shape whose dimension is made as small as possible to suffice the required one. The color filter 31 is provided at its diametrically opposite portions with position determining poles 31a which engage with the legs 30a of the boundary plate 30 such that the color filter 31 is not dropped by its own weight along the leg 30a. It is preferable to make the color filter 31 with a material which can shade the defective light rays. For this reason, the number of colors is limited so that, eventually, in addition to the color filter 31 provision may be made for a separate filter for shading only the defective light rays. The filter 31 may have a thickness on the order of at most 50 microns. As a result, even when the color filter 31 is composed of two thin sheets superimposed one upon the other, its total thickness is 100 microns, so that it has substantially no influence upon the overall thickness of the wrist watch. In addition, if two thin sheets may be adhered together into an integral body which is then punched into a desired shape in an easy manner.

As described above, the structure which supports the liquid crystal cell 9 is fitted into the rear cover 29, then the boundary plate 30 with the color filter 31 previously mounted thereon is disposed on the movement and subsequently the protective glass cover 37 and the barrel 28 are attached in succession to the rear cover 29 to complete a wrist watch. After the wrist watch has been completed, if it desired to replace the color filter 31 by another filter in dependence with the display condition, the barrel 28, protective glass cover 37, and boundary plate 30 are removed from the rear cover 29 in reverse order. Then, the color filter 31 is removed from beneath the boundary plate 30, and can be replaced by another color filter. In this case, the replacement of the color filter 31 by another color filter may easily be effected without removing the movement from the rear cover 29. In addition, if the color filter 31 is mounted on the boundary plate 30 such that the color filter 31 can not be dropped due to its own weight along the leg 30a, the color filter 31 is not required to be handled in assembling and disassembling the wrist watch. As a result, there is no risk of the color filter 31 being misplaced or broken. In addition, if the color filter 31 is mounted on the liquid crystal cell 9 such that the relative position between the color filter 31 and the liquid crystal cell 9 can be determined in their assembled condition, that area of the color filter 31 which covers the liquid crystal cell 9 can be made as small as possible so that the material for the color filter 31 can be saved.

In the present embodiment, use was made of the boundary plate 30. The boundary plate 30 may eventually be omitted. Alternatively, legs for determining the position of the color filter 31 may be projected from the movement or the position of the color filter 31 may be determined by its outer periphery and the like. Such alternations may be effected without departing the essentials of the invention.

With the liquid crystal display wrist watch according to the invention it is possible to easily replace the color filter by another color filter and hence, it is possible to display various of colors. In addition, it is possible to manufacture the color filter at low cost.

What is claimed is:

1. A timepiece having a liquid crystal display and comprising:
    an electric battery, a crystal oscillator driven by said battery for producing time reference signals;
    an electronic circuit for driving the display by means of signals delivered from said crystal oscillator, said circuit having an array of wire leads from said circuit for connecting said display;

a liquid crystal cell having an array of exterior electrodes for connecting to said wire leads;

an outer case for enclosing a movement therein, said outer case including a protective glass cover and a rear cover, which constitutes at least two elements of said outer case, the improvement characterized by:

a supporting frame defining an open area slightly larger than the area of said liquid crystal cell so that the liquid crystal cell can be removed from the watch by passing through the opening, said supporting frame mounted in said outer case for maintaining an aligned relationship between the array of wire leads of said electronic circuit and said outer case, said supporting frame having two wall surfaces extending in intersecting planes for engaging and positioning the liquid crystal cell and lands for supporting the electrodes of the liquid crystal cell and the wire leads of the electronic circuit, said liquid crystal cell having a reference surface extending along a side of the cell having no leads, said reference surface corresponding in orientation to one of said two wall surfaces of said supporting frame, the position of the array of exterior electrodes of said liquid crystal cell being determined by abuttment between said one wall surface and said reference surface of said liquid crystal cell;

a resilient member for biasing a side of said liquid crystal cell opposed to said reference surface, thereby urging said reference surface of said liquid crystal cell against said one wall surface of said supporting frame; and at least one holding frame plate releasably secured to said timepiece, and overlaying said liquid crystal cell to hold said liquid crystal cell within the opening of the supporting frame and for sandwiching the contact surfaces of the wire leads of the electronic circuit between the contact surfaces of the electrodes of the liquid crystal cell and the lands of the supporting frame.

2. A liquid crystal display timepiece, as claimed in claim 1, wherein said liquid crystal cell is transparent and wherein said holding frame plate is positioned so that contacting portions between said exterior electrodes of said liquid crystal cell and said exterior wirings of said electronic circuit are visible from the exterior of said liquid crystal cell after said holding frame plate has been secured in place.

3. A liquid crystal display timepiece, as claimed in claim 1, further including a substrate for supporting the electronic circuit wherein at least one fastening member is provided for fastening said holding frame plate to said substrate, said holding frame plate being provided with a fastening portion and a fastening release portion corresponding in size, to said fastening member, whereby said holding frame plate is detachable without removing said fastening member from said substrate.

4. A liquid crystal display timepiece, as claimed in claim 1, wherein a boundary plate is sandwiched between said liquid crystal cell and a protective glass cover, said boundary plate having a portion for determining the position thereof with respect to said liquid crystal cell and said outer case, said boundary plate being detachable from said liquid crystal cell and said outer case.

5. A liquid crystal dislay timepiece, as claimed in claim 4, wherein a color filter is sandwiched between said liquid crystal cell and a protective glass cover, said filter having a portion for determining the position thereof with respect to said liquid crystal cell and said outer case, said color filter being detachable from said liquid crystal cell and said outer case.

6. The timepiece of claim 1, further including:
resilient buffer means positioned in the lands of the supporting frame and engaging the wireleads to cushion the wire leads against the electrodes as the electrodes are held in engagement with the wire leads by the holding frame plate overlying the liquid crystal cell.

7. The timepiece of claim 6, further including:
resilient means disposed between the holding frame plate and liquid crystal cell to cushion the engagement between the holding plate and cell.

8. The timepiece of claim 3, wherein the fastening member is a screw which secures the supporting frame to the substrate, and is received in a keyhole notch in the holding frame plate which forms the release portion of the holding frame plate, so that the holding frame can be removed from the screw without removing the screw from the substrate.

9. A liquid crystal display timepiece, as claimed in claim 7, further including a substrate for supporting the electronic circuit wherein at least one fastening member is provided for fastening said holding frame plate to said substrate, said holding frame plate being provided with a fastening portion and a fastening release portion corresponding in size, to said fastening member, whereby said holding frame plate is detachable without removing said fastening member from said substrate.

10. The timepiece of claim 9, wherein the fastening member is a screw which secures the supporting frame to the substrate, and is received in a keyhole notch in the holding frame plate which forms the release portion of the holding frame plate, so that the holding frame can be removed from the screw without removing the screw from the substrate.

11. The timepiece of claim 1, wherein the contact surfaces of the electrodes are wider than the contact surfaces of the wire leads.

12. The timepiece of claim 11, wherein the contact surfaces are made of a material selected from the group consisting of:
gold, platinum, silver and palladium.

13. The timepiece of claim 12, wherein the electrodes of the liquid crystal cell have ends which are spaced from the peripheral edge of said liquid crystal cell.

14. In a timepiece having a liquid crystal display cell with an array of electrodes and electronic circuitry with an array of wire leads:

a supporting frame having an opening therein for receiving the display cell and land means therein for supporting the array of wire leads beneath the array of electrodes, holding plate means overlying said display cell for retaining the display cell within the opening and holding the electrodes in engagement with the leads, and means for fastening the holding plate means to the supporting frame including at least one screw registered with a keyhole slot in the holding plate means, wherein the screw is loosened, but not necessarily removed to slide the holding plate means from overlying said display cell so that said display cell can be removed from said supporting frame, the holding plate means having a first flange for overlying the display cell and a second flange which is joined by a mutually perpendicular web to the first flange, the keyhole slot having a wide portion through the web and a narrow portion through the second flange, the wide portion being wider than the head of the screw and the narrow portion being narrower than the head of the screw, the supporting frame having a notch, with a surface parallel to the liquid crystal display upon which the second flange rests, and a surface perpendicular to the liquid crystal display against which the web is held when the first flange overlies the cell.

15. The timepiece of claim 14 wherein the screw passes through the supporting frame and holds the supporting frame to a substrate which supports the electronic circuitry.

16. The timepiece of claim 15 wherein there are two notches oppositely disposed in said supporting frame and wherein a holding plate means is mounted in each notch to overlie opposite ends of the display cell.

17. The timepiece of claim 16 wherein there are a pair of spaced keyholes in each plate each of which receives a screw.

18. A liquid crystal display timepiece comprising:
a liquid crystal cell,
a flexible sheet having
a printed circuit thereon,
a metal substrate having
at least two screw holes therein,
said flexible sheet being positioned between said liquid crystal cell and said metal substrate,
means including a cell holding member for electrical connection of said liquid crystal cell and said flexible sheet and securement of said connected cell and sheet on said metal substrate, and
a plurality of screws engaging said screwholes and said cell holding member.

* * * * *

UNITED STATES PATENT AND TRADEMARK OFFICE
CERTIFICATE OF CORRECTION

PATENT NO. : 4,083,177
DATED : April 11, 1978
INVENTOR(S) : NISHIMURA, ET AL.

It is certified that error appears in the above-identified patent and that said Letters Patent are hereby corrected as shown below:

After item [30] on the first page, add the following Foreign Application Priority Data

```
Japanese Application No. 136211/73 - filed December 7, 1973
Japanese Application No. 115915/73 - filed October 4, 1973
Japanese Application No. 115916/73 - filed October 4, 1973
Japanese Application No. 115917/73 - filed October 4, 1973
Japanese Application No. 146834/73 - filed December 20, 1973
Japanese Application No. 26086/74  - filed March 7, 1974
Japanese Application No. 26088/74  - filed March 7, 1974
Japanese Application No. 27572/74  - filed March 9, 1974
Japanese Application No. 31072/74  - filed March 18, 1974
Japanese Application No. 31757/74  - filed March 22, 1974
Japanese Application No. 33821/74  - filed March 25, 1974
Japanese Application No. 34427/74  - filed March 28, 1974
```

Signed and Sealed this

Twenty-fifth Day of March 1980

[SEAL]

Attest:

SIDNEY A. DIAMOND

Attesting Officer     Commissioner of Patents and Trademarks